Dec. 31, 1968  B. F. KEARNS  3,419,025

PROTECTIVE SLEEVE FOR TARPAULIN RIGGING

Filed Dec. 13, 1966

INVENTOR.
BRANTLEY F. KEARNS
BY David Rabin

United States Patent Office 3,419,025
Patented Dec. 31, 1968

3,419,025
PROTECTIVE SLEEVE FOR TARPAULIN RIGGING
Brantley F. Kearns, 2227 S. Main St., High Point,
N.C. 27263
Filed Dec. 13, 1966, Ser. No. 601,452
3 Claims. (Cl. 135—5)

ABSTRACT OF THE DISCLOSURE

This invention relates to a protective sleeve for encapsulating and insulating rigging that is used to secure tarpaulins and the like in an article-covering position and preventing the rigging from rubbing or abrading directly against an exposed finished surface. The invention includes a novel attachment to the tarpaulin and a uniquely designed receiving slot through which rigging is releasably secured to a tarpaulin eyelet.

State of the prior art

A great number of protective sleeves or tubular members have been used for a number of years to provide some insulating or buffering device about chains, riggings, lashings and the like when those articles are likely to come in contact with sensitive, polished or esthetic surfaces and the vibration or movement of these securing members would likely damage those surfaces. Among those devices known are rubber tubular members which slide over chains or ropes, molded styrene or polyurethane slipped over mooring lines to avoid scratching the finished surface of a boat which is docked, burlap wrapped about a chain or rope to avoid having that member mar an adjacent surface contiguous therewith, canvas sleeves positioned over a supporting chain as on a punching bag or the like to preclude injury to the user's hands if inadvertently struck, and other similarly related environments. The problem arising when a tarpaulin or protective cover is used in conjunction with the truck bed of a small vehicle or the luggage rack of an automobile is that when these coverings are secured by a rope, chain, or other rigging, and the vehicle then gets underway, these securing means have a tendency to vibrate because of the terrain, the wind, and other factors, thus abrading against any adjacent surface and doing particular damage to that surface it should happen to be the metallic finish of the vehicle. The conventional method of preventing such disfiguration is to wrap these lines with burlap, cloth or other material to add dimension to its bulk and thus preclude vibration or to buffer the line to the extent that vibration will not affect the adjacent finished surface.

While such methods are generally satisfactory, a number of disadvantages are apparent since the rigging insulation is likely to become detached since it is an articulated rather than integral portion of the tarpaulin, and thus it can be lost during movement and the abrasion mentioned above commenced without knowledge of the user. Additionally, the installation of such insulation is time consuming and tedious, and it is extremely unlikely that such insulation can be used for an indefinite period of time as it becomes very worn from the individual wrapping and securement about the rigging and must be replaced at frequent intervals.

Brief summary of the present invention

With the limitations of the prior art in mind, the present invention has been developed to overcome a number of disadvantages apparent in those techniques formerly used and includes the securement at intervals about a protective canvas or tarpaulin precisely at the location of pre-formed and attached eyelets which are used to releasably receive rigging or lashings, a number of tubular members which are sewn to the canvas and are adapted to partially expose these eyelets so that a rigging member may be extended therethrough and secured to the tarpaulin without being blocked by the sleeve itself. This permits the metallic portion of the rigging to be totally insulated so that vibration and movement of that rigging component will not cause an abrasion of an adjacent surface as heretofore has been the case.

The tubular member is preferably made of canvas or a similar material and is seamed along one edge, that seam then being covered by a separate piece of material to strengthen and cover the previously formed seam. The upper portion of the sleeve is folded over and sewn against the tarpaulin or protective covering and a slotted indentation is partially exposed so that the latching member attached to the rigging for securement to the tarpaulin may pass therethrough.

Objects of the present invention

It is, therefore, a principal object of the present invention to provide a protective sleeve for shrouding and insulating rigging used to secure tarpaulins and the like in a load-covering or protective position and prevent the rigging from rubbing directly against an exposed surface that is secured to or integral with the protective covering itself.

Another object of the present invention is to provide a protective sleeve as described above which cannot be removed, misplaced or lost from the covering itself as has been the case in prior art attachments.

Yet another object of the present invention is to provide a protective sleeve as described above that has unique slotted means for allowing the rigging to pass therethrough and attach to the protective covering or tarpaulin.

Still another object of the present invention is to provide a protective sleeve as described above that can be expeditiously and economically attached to existing canvas coverings without damaging or otherwise altering those coverings in any manner whatsoever.

Yet still another object of the present invention is to provide a protective sleeve as described above which, when secured to the tarpaulin, will eliminate the tedious and time consuming method of padding or insulating rigging heretofore used.

A further object of the present invention is to provide a protective sleeve as described above which is extremely simple in construction, economical in cost and durable in fabrication.

Other objects and attendant advantages of the present invention will become more apparent to those skilled in the art when taken in conjunction with the following description as illustrated by the accompanying drawings in which like characters or reference indicate like parts, and in which.

Figure 6:
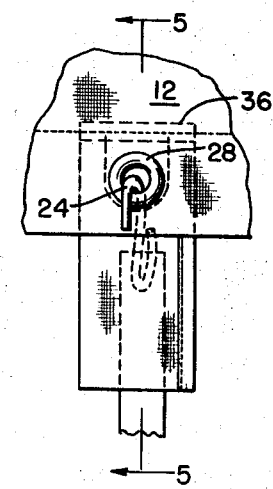
Figures 4, 5:
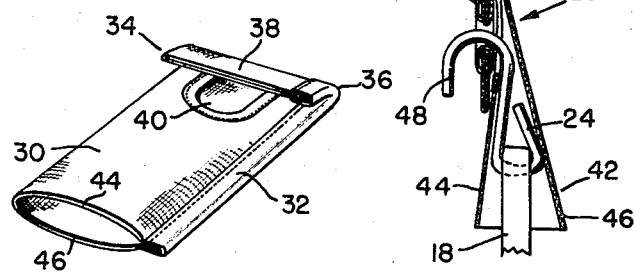
FIG. 4 is an enlarged and perspective view of the protective sleeve of the present invention isolated from a tarpaulin or protective covering.

FIG. 5 is a side elevational, fragmentary, sectional and enlarged view of the protective sleeve of the present invention secured to a tarpaulin or protective covering and accommodating the latching mechanism of the rigging extending therethrough; and FIG. 6 is a fragmentary, sectional, enlarged and front elevational view of the protective sleeve of the present invention secured to a tarpaulin and positioned about a rigging receiving eyelet.

*Detailed description of preferred embodiment*

Figure 1:
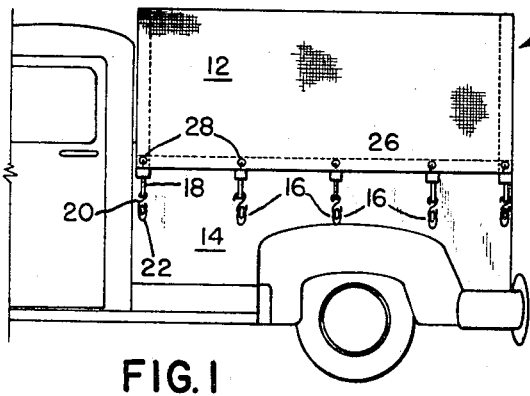
FIG. 1 is a fragmentary and side elevational view of a truck bed covered by a tarpaulin or canvas which utilizes the protective sleeve of the present invention to shroud rigging or lashing securing the covering to the truck bed.
Figure 2:
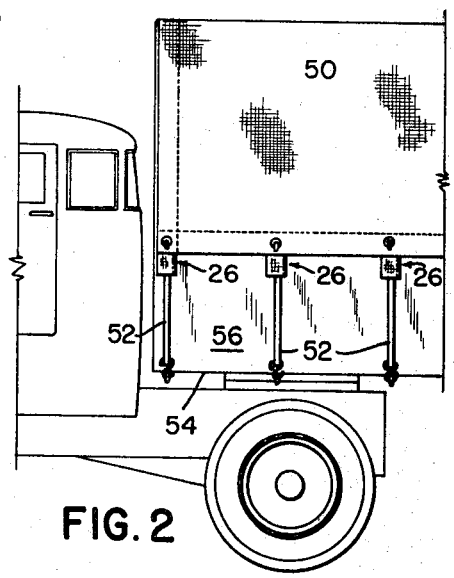
FIG. 2 is a fragmentary side elevational view of a truck bed covered by a canvas or tarpaulin utilizing the protective sleeve of the present invention to house securing rigging which is positioned in a different location than that illustrated in FIG. 1.
Figure 3:
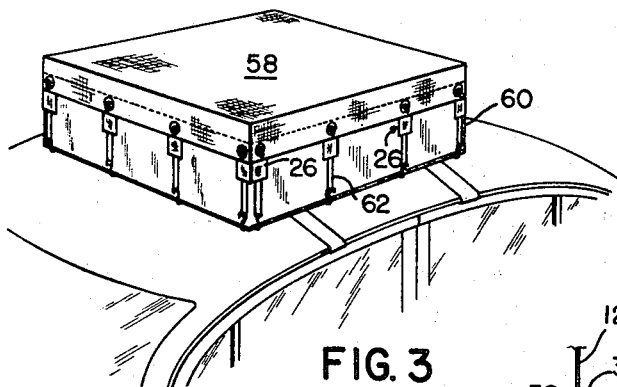
FIG. 3 is a perspective and fragmentary view of a car roof luggage rack covered by a tarpaulin utilizing the protective sleeves of the present invention to house the rigging holding the covering in place.

The present invention is environmentally portrayed best in FIGS. 1, 2 and 3, and there is shown in FIG. 1 a conventional pick-up truck generally designated 10 having its bed covered by a tarpaulin 12 which is held against the truck bed 14 in a covering or protective manner by a number of riggings or lashings 16. The lashings are made up of a strand 18 and a latching mechanism 20 which hooks about a protuberance 22 secured to the truck body.

Strand 18 at its upper end has a similar hook or latch 24 which is shown in FIG. 5, and this upper portion is insulated by a protective sleeve generally designated 26 which will now be described in detail.

Tarpaulin 12 will have at spaced apart intervals eyelets 28 to releasably receive rigging securing hooks such as those shown in FIG. 5 and designated 24 so that the covering may be held in the protective positioning during movement of the vehicle to which the rigging is attached. It has been found extremely advantageous to provide a protective sleeve having a tubular portion 30 which is formed when a flat piece of canvas or similar material is folded upon itself (see FIG. 4) and an additional fabric fragment 32 is bent about this seam and sewn therewith. The tubular portion 30 is then folded along its upper end 34 about the foldline 36 so that a lip 38 formed from this fold can then be sewn directly against the tarpaulin 12 by any number of stitching or securing techniques to avoid inadvertent removal therefrom.

To assist in the positioning of the rigging hook 24 through eyelet 28 about which sleeve 26 has been positioned, a downwardly extending slot 40 substantially exposes eyelet 28 therethrough so that hook 24 can be easily slipped within. Thus there results an outward flaring 42 and 46 of the tubular portion 30 to accommodate and insulate hook 24 therein so that as the rigging 18 vibrates during vehicle movement, there can be no abrasive movement of the hook 24 against a finished surface adjacent thereto.

Additional applications of the present invention are illustrated particularly in FIGS. 2 and 3, FIG. 2 showing the application of a tarpaulin 50 with the protective sleeve 26 which has extended rigging strands 52 secured at their lowermost portion at the very lower edge 54 of the truck body 56. FIG. 3 illustrates the adaptability of the present invention to shallow coverings such as that designated 58 for use with automobile luggage racks 60 and the like which have highly finished surfaces similar to that of the automobile itself that are to be protected. The use of sleeve 26 therewith provides insulation for rigging strand 62 and prevents marring of the finished surface of the rack 60.

The examples shown in FIGS. 1, 2 and 3 are merely illustrative of numerous applications of such a device, and obviously the present invention lends itself for use in any application where a canvas or covering member is supported by rigging that might possibly abrade or rub against an adjacent finished surface. Additionally, in those applications where tennis courts, boxing rings, wrestling rings, and the like are supported above a highly polished hardwood surface such as that usually found in a gymnasium, the rigging elevating these floors above the polished surface should be protected by a sleeve in the event that the rigging could possibly rub against the polished floor. The present invention lends itself readily to such an adaptation and is so recommended.

While a single preferred embodiment of the present invention has been described in detail, it will be obvious to one skilled in the art that modifications may be made in the tubular portion, the slotted indentation and the folded attaching flap as well as other phases of the present inventive concept without departing from the real spirit and purpose of this invention and such alterations and modifications are contemplated.

What is claimed is:

1. A protective sleeve for shrouding and insulating removable rigging used to secure tarpaulins and the like in a protecting position and preventing the rigging from rubbing directly against an exposed adjacent surface comprising: a tubular portion substantially enveloping the rigging extending from the tarpaulin and having an upper end secured to the tarpaulin in overlying relation therewith, said end having a slot, said slot aligned with an eyelet adjacent an edge of the tarpaulin thereby providing access for the rigging through the protective sleeve to the eyelet.

2. A protective sleeve as claimed in claim 1, said tubular portion being seamed along a longitudinal edge to close the portion; and a fabric ridge covering said seam and sewn simultaneously therewith.

3. A protective sleeve as claimed in claim 1, said upper end being folded over and sewn flatly against the tarpaulin and said slotted means extending therebeneath to receive the fastening mechanism of the rigging.

References Cited

UNITED STATES PATENTS

| 2,223,145 | 11/1940 | Wise | 160—368 |
| 2,614,630 | 10/1952 | Mosfelt | 160—368 |
| 3,046,056 | 7/1962 | Greene et al. | 297—385 |
| 3,313,574 | 4/1967 | Nicholas | 297—388 |

KENNETH DOWNEY, *Primary Examiner.*

U.S. Cl. X.R.

24—225